US012805639B2

(12) United States Patent
Funato et al.

(10) Patent No.: US 12,805,639 B2
(45) Date of Patent: Nov. 24, 2026

(54) SEAT PAD AND METHOD FOR MANUFACTURING THE SAME

(71) Applicants: Archem Inc., Tokyo (JP); KYORAKU CO., LTD., Kyoto (JP)

(72) Inventors: Takafumi Funato, Kyoto (JP); Tomohiro Taniguchi, Kyoto (JP); Yoshiyuki Takahashi, Yokohama (JP); Masakazu Igarashi, Nabari (JP); Yukiko Yamaguchi, Tokyo (JP)

(73) Assignees: Archem Inc., Minato-ku (JP); KYORAKU CO., LTD., Kyoto (JP)

( * ) Notice: Subject to any disclaimer, the term of this patent is extended or adjusted under 35 U.S.C. 154(b) by 216 days.

(21) Appl. No.: 18/703,360

(22) PCT Filed: Nov. 14, 2022

(86) PCT No.: PCT/JP2022/042292
§ 371 (c)(1),
(2) Date: Apr. 22, 2024

(87) PCT Pub. No.: WO2023/090301
PCT Pub. Date: May 25, 2023

(65) Prior Publication Data

US 2025/0185810 A1 Jun. 12, 2025

(30) Foreign Application Priority Data

Nov. 22, 2021 (JP) ................................ 2021-189531

(51) Int. Cl.
*A47C 7/18* (2006.01)
*B60N 2/70* (2006.01)

(52) U.S. Cl.
CPC ............. *A47C 7/18* (2013.01); *B60N 2/7017* (2013.01)

(58) Field of Classification Search
CPC ................................ A47C 7/20; A47C 7/185
See application file for complete search history.

(56) References Cited

U.S. PATENT DOCUMENTS 8,827,372 B2 * 9/2014 Yoon .................... B60N 2/7017 297/452.46
2019/0291534 A1 9/2019 Arata et al.
2021/0221194 A1 7/2021 Arata et al.

FOREIGN PATENT DOCUMENTS

CN 105829054 A * 8/2016 ............. A61C 17/16
EP 2468473 A1 * 6/2012 ........... B62D 29/004
(Continued)

OTHER PUBLICATIONS

May 2, 2024, International Preliminary Report on Patentability issued in the International Patent Application No. PCT/JP2022/042292.
(Continued)

*Primary Examiner* — Richard Green
(74) *Attorney, Agent, or Firm* — KENJA IP LAW PC

(57) ABSTRACT

A seat pad (1) has a hollow body (10) made of resin and a foam body (F) in which the hollow body (10) is embedded. The hollow body (10) has one or more apertures (A10) formed therein, and the one or more apertures (A10) are formed to satisfy the condition of 10≤S/V (where S is total area of the apertures, and V is internal volume of the hollow body). A method for manufacturing a seat pad uses the hollow body (10) and includes a hollow body placement step of placing the hollow body (10) in a cavity formed by closing a molding die, and a foam body formation step of forming the foam body by foaming resin supplied into the cavity after the hollow body placement step.

12 Claims, 8 Drawing Sheets

(56) References Cited

FOREIGN PATENT DOCUMENTS

| | | | | | |
|---|---|---|---|---|---|
| JP | S59142118 A | * | 8/1984 | ........... | B29C 44/583 |
| JP | S60168914 U | | 11/1985 | | |
| JP | H01159214 A | | 6/1989 | | |
| JP | H0237849 B2 | * | 8/1990 | ......... | B29C 44/1271 |
| JP | H02266906 A | | 10/1990 | | |
| JP | 6207689 B2 | | 10/2017 | | |
| JP | 2019024534 A | | 2/2019 | | |
| JP | 2019162948 A | | 9/2019 | | |

OTHER PUBLICATIONS

Jan. 24, 2023, International Search Report issued in the International Patent Application No. PCT/JP2022/042292.

* cited by examiner

SEAT PAD AND METHOD FOR MANUFACTURING THE SAME

TECHNICAL FIELD

This disclosure relates to a seat pad and a method for manufacturing the same.

BACKGROUND

Conventional seat pads include a ducted seat pad in which ducts made of resin are embedded (See, for example, PTL 1.). The ducted seat pad is foam molded by sealing an air intake port of the duct with sealing tape and sealing an air outlet port of the duct with a ridge provided on a lower die.

CITATION LIST

Patent Literature

PTL 1: JP 6207689 B1

SUMMARY

Technical Problem

However, when performing foam molding with the interior of the hollow body made of resin closed, as in the above ducted seat pad, deformation may occur in the hollow body.

The purpose of the present disclosure is to provide a seat pad in which deformation of a hollow body made of resin, embedded in a foam body, is controlled, and a method for manufacturing a seat pad to obtain that seat pad.

Solution to Problem

A seat pad according to this disclosure comprises a hollow body made of resin and a foam body in which the hollow body is embedded, the hollow body has one or more apertures formed therein, and the one or more apertures are formed to satisfy the condition of:

$$10 \leq S/V \quad (1)$$

where S is total area of the apertures (square centimeters), and V is internal volume of the hollow body (liters). According to the seat pad of this disclosure, the seat pad can be the one in which the deformation of the hollow body 10 made of resin is controlled.

In the seat pad according to this disclosure, it is preferable that the one or more apertures are formed to satisfy the condition of:

$$S/V \leq 30 \quad (2)$$

In this case, the seat pad can be the one in which the deformation of the hollow body 10 made of resin is further controlled.

In the seat pad according to this disclosure, it is preferable that the hollow body has two opposing walls and a support pillar supporting the two opposing walls inside the hollow body. In this case, the seat pad can be the one in which the deformation of the hollow body 10 made of resin is further controlled.

In the seat pad according to this disclosure, it is preferable that the hollow body has a rib extending along a surface of the hollow body. In this case, the seat pad can be the one in which the deformation of the hollow body 10 made of resin is further controlled.

A method for manufacturing a seat pad according to this disclosure is a method for manufacturing a seat pad having a hollow body made of resin and a foam body in which the hollow body is embedded, and the method includes: a hollow body placement step of placing the hollow body in a cavity formed by closing a molding die; and a foam body formation step of forming the foam body by foaming resin supplied into the cavity after the hollow body placement step, the hollow body has one or more apertures formed therein, and the one or more apertures are formed to satisfy the condition of:

$$10 \leq S/V \quad (1)$$

where S is total area of the apertures, and V is internal volume of the hollow body. According to the method for manufacturing a seat pad in accordance with this disclosure, it is possible to obtain a seat pad in which deformation of the hollow body made of resin, embedded in the foam body, is controlled.

In the method for manufacturing a seat pad according to this disclosure, it is preferable that the one or more apertures are formed to satisfy the condition of:

$$S/V \leq 30 \quad (2)$$

In this case, it is possible to obtain a seat pad in which deformation of the hollow body made of resin, embedded in the foam body, is further controlled.

In the hollow body placement step in the method for manufacturing a seat pad according to this disclosure, it is preferable that the apertures are placed in a location that does not coincide with a supply port where the resin is supplied. In this case, the total area of the apertures can be secured while reducing the density decrease of the foam body.

In the hollow body placement step in the method for manufacturing a seat pad according to this disclosure, it is preferable that the apertures are placed in a location that does not coincide with a mating surface of the molding die. In this case, it is possible to obtain a seat pad in which deformation of the hollow body made of resin, embedded in the foam body, is further controlled.

In the method for manufacturing a seat pad according to this disclosure, it is preferable that the hollow body has two opposing walls and a support pillar supporting the two opposing walls inside the hollow body. In this case, it is possible to obtain a seat pad in which deformation of the hollow body made of resin, embedded in the foam body, is further controlled.

In the method for manufacturing a seat pad according to this disclosure, it is preferable that the hollow body has a rib extending along a surface of the hollow body. In this case, it is possible to obtain a seat pad in which deformation of the hollow body made of resin, embedded in the foam body, is further controlled.

Advantageous Effect

According to the present disclosure, it is possible to provide a seat pad in which deformation of a hollow body made of resin, embedded in a foam body, is controlled, and a method for manufacturing a seat pad to obtain that seat pad.

DETAILED DESCRIPTION

Figure 1:
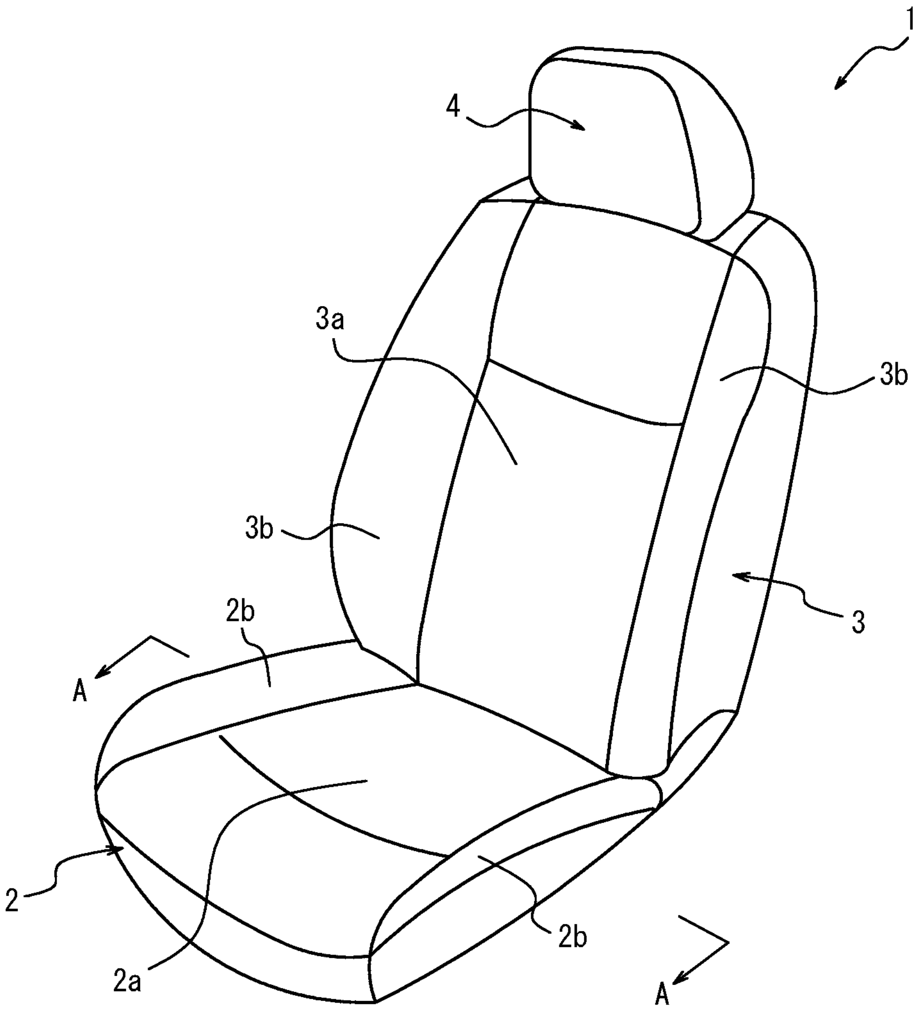
FIG. 1 is a perspective view schematically illustrating a seat pad according to one embodiment of this disclosure.

Referring to the drawings below, a seat pad and a method for manufacturing the seat pad in accordance with one embodiment of the present disclosure will be described. In the following descriptions, front/rear, left/right, and up/down are positions (orientations) based on when the seat pad is installed in a vehicle, especially left/right are positions (orientations) based on when the seated person is facing forward, unless otherwise explained.

[Seat Pad]

Referring to FIG. 1, the reference numeral 1 is a seat pad, in accordance with one embodiment of the present disclosure. The seat pad 1 according to this disclosure is a cushioning material that forms part of an automobile seat. The seat pad 1 according to this disclosure comprises a cushion pad 2 for supporting the buttocks and thighs of the seated person, a back pad 3 for supporting the upper back and lower back of the seated person, and a headrest 4 for supporting the head of the seated person.

The cushion pad 2 has a center pad section 2*a* and side pad sections 2*b* located on both the left and right sides of the center pad section 2*a*. The center pad section 2*a* is configured to support the buttocks and thighs of the seated person from below. The two side pad sections 2*b* are configured to support the buttocks and thighs of the seated person from the both sides.

The back pad 3 also has a center pad section 3*a* and side pad sections 3*b* located on both sides of the center pad section 3*a*. The center pad section 3*a* is configured to support the upper back and lower back of the seated person from the rear. The two side pad sections 3*b* are configured to support the upper back and lower back of the seated person from the both sides.

Figure 2:
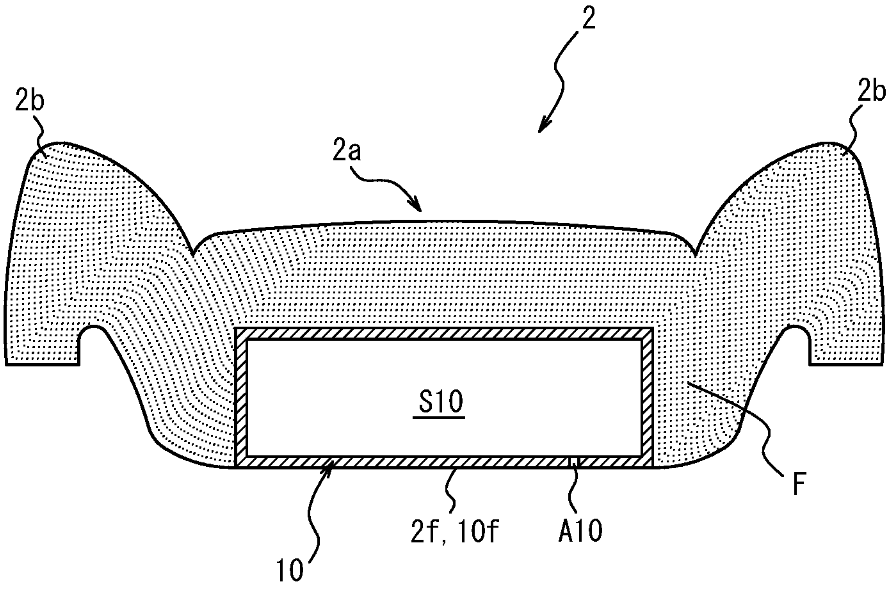
FIG. 2 is a cross-sectional view of the seat pad illustrated in FIG. 1 taken along the line A-A in FIG. 1.

Referring to FIG. 2, in the seat pad 1 according to the present disclosure, the cushion pad 2 has a hollow body 10 made of resin and a foam body F in which the hollow body 10 is embedded, and the hollow body 10 has one or more apertures A10 formed therein.

In this embodiment, the foam body F is composed of a foam resin. The foam resin is formed by foaming resin. Polyurethane is an example of the resin. Soft polyurethane is preferred as the polyurethane. However, according to the present disclosure, a variety of resins that can be foamed can be used as the resin.

In this embodiment, the hollow body 10 is a bulk material with a lighter specific gravity than the foam body F. The bulk material is embedded in the foam F to reduce the weight of the seat pad. In this embodiment, the hollow body 10 is a blow molded product. The hollow body 10 is positioned close to the back (bottom) surface 2*f* of the cushion pad 2 (seat pad). In this embodiment, the outer surface 10*f* of the hollow body 10 and the back surface 2*f* of the cushion pad 2 are coincident. That is, in this embodiment, the hollow body 10 is embedded in the foam body F to form part of the back surface 2*f* of the cushion pad 2. An interior space S10 is formed inside the hollow body 10. The aperture A10 is a through hole formed in the hollow body 10. The aperture A10 allows the interior space S10 to communicate with the exterior space. The hollow body 10 is embedded in the foam body F so that the aperture A10 opens toward the back (bottom) surface 2*f* of the cushion pad 2 (seat pad). Polypropylene (PP) is an example of the resin that constitutes the hollow body 10. However, according to the present disclosure, a variety of resins can be used as the resin.

The apertures A10 can be at least one. However, the one or more apertures A10 are formed to satisfy the condition of the following formula (1).

$$10 \leq S/V \qquad (1)$$

S: Total area of the apertures A10 (square centimeters),

V: Internal volume of the hollow body 10 (liters)

If there is one aperture A10, the total area S is the opening area S1 of the one aperture A10. If there is more than one aperture A10, it is the sum of the opening area S1 of all the apertures A10. The opening area S1 is, for example, $S1=\pi\times(r1)^2$ if the aperture A10 is a round hole of radius r1. The unit for the total area S is square centimeters ($cm^2$).

The internal volume V is the volume of the interior space S10 of the hollow body 10. The interior space S10 is a closed space before the one or more apertures A10 are formed. The unit for the internal volume V is the liter (L).

FIGS. 3 through 6 illustrate an example of the hollow body 10 applicable to the seat pad 1. In this embodiment, the hollow body 10 is embedded in the foam body F of the cushion pad 2.

Figure 3:
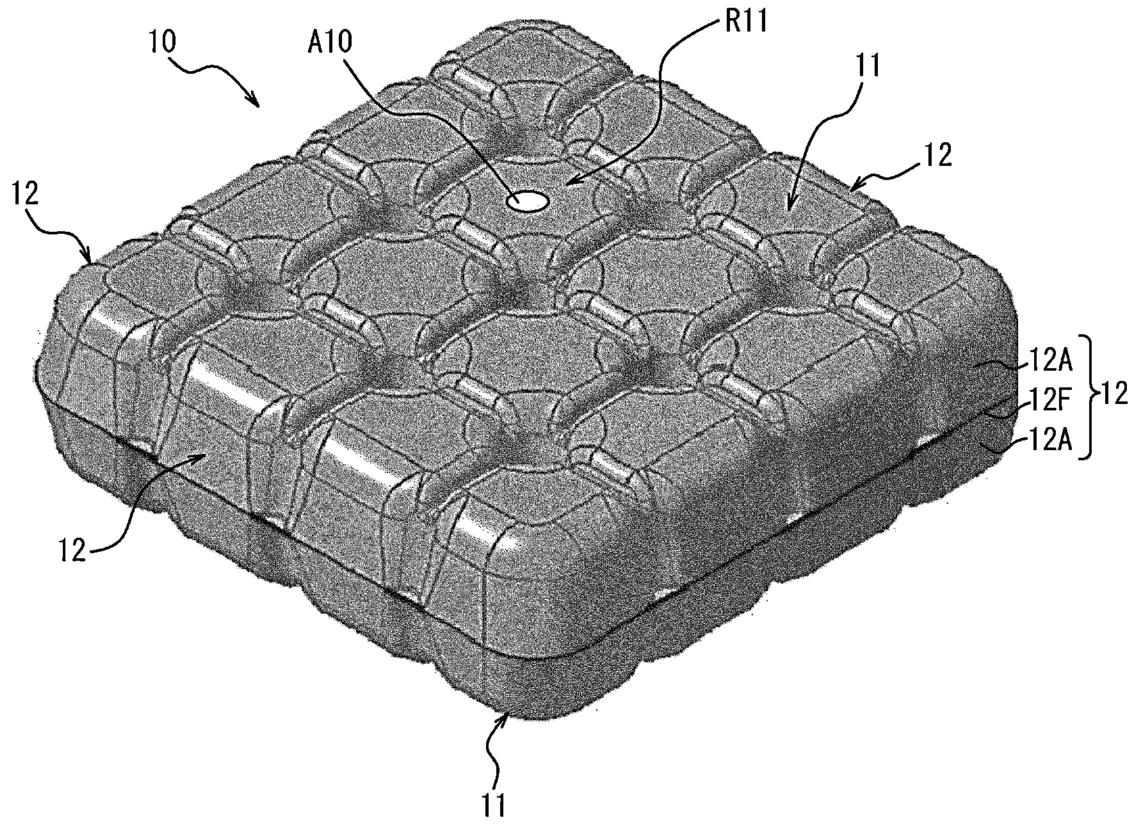
FIG. 3 is a perspective view illustrating an example of a hollow body applicable to the seat pad illustrated in FIG. 1.

Referring to FIG. 3, the hollow body 10 has two opposing walls 11 and sidewalls 12 connected to the two opposing walls 11. The interior space S10 of the hollow body 10 is an interior space defined by the two opposing walls 11 and the sidewalls 12 (See, for example, FIGS. 5 and 6.).

Figure 4:
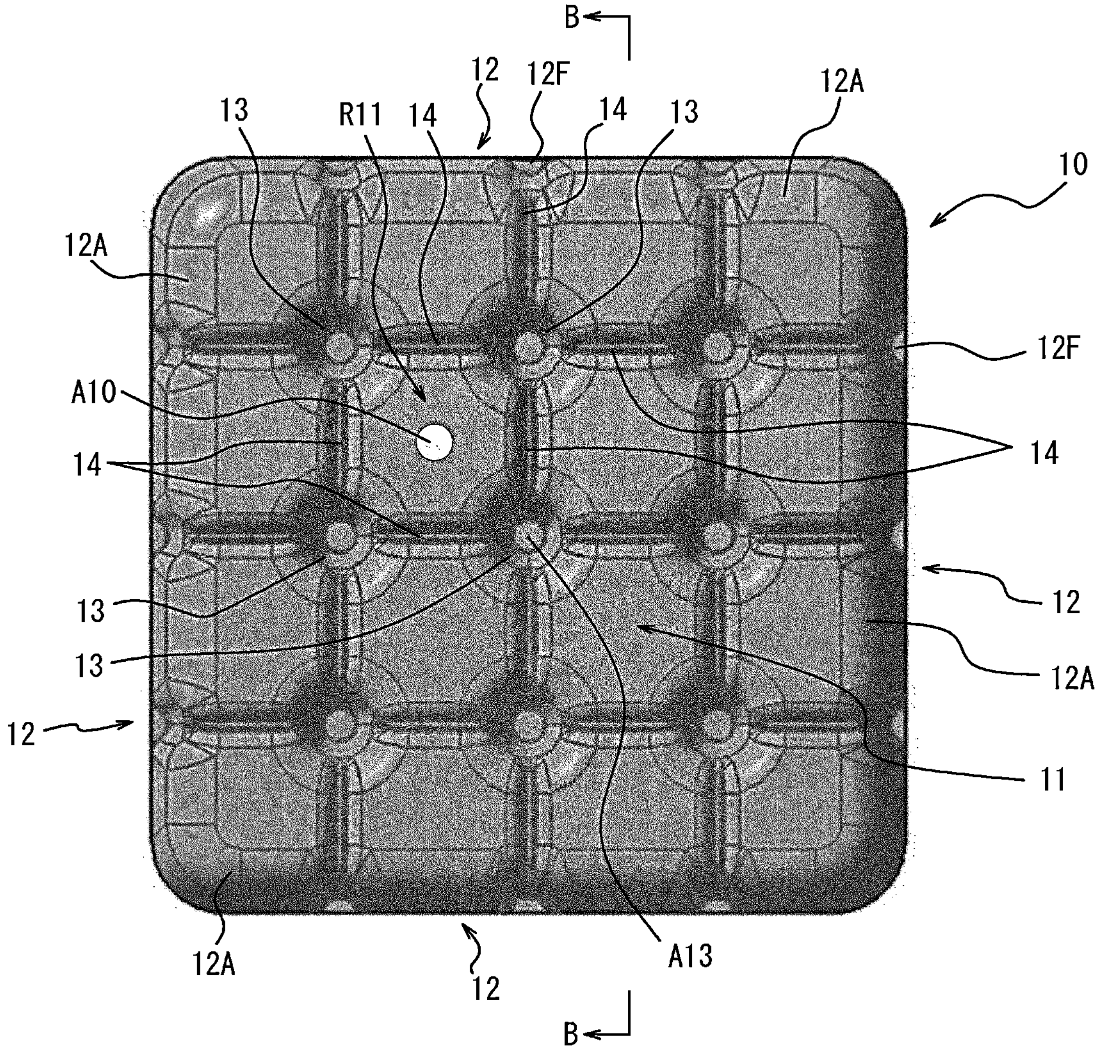
FIG. 4 is a plan view of the hollow body illustrated in FIG. 3.

In this embodiment, the hollow body 10 has a rectangular parallelepiped external shape. Specifically, as illustrated in FIG. 4, the external shape of the two opposing walls 11 is quadrangle in plan view. In this embodiment, the sidewalls 12 includes four sidewalls 12. Referring to FIG. 3, the four sidewalls 12 are each formed by two sloping walls 12A that slope outward from one opposing wall 11 toward the other. In this embodiment, the confluence part of the two sloping walls 12A is formed by a flange 12F that goes around the hollow body 10 along the four side walls 12. In this embodiment, the flange 12F is placed at the center position in the thickness direction of the hollow body 10. Here, the thickness direction of the hollow body 10 is the direction along which the perpendicular lines of the two opposing walls 11 extend.

Figure 5:
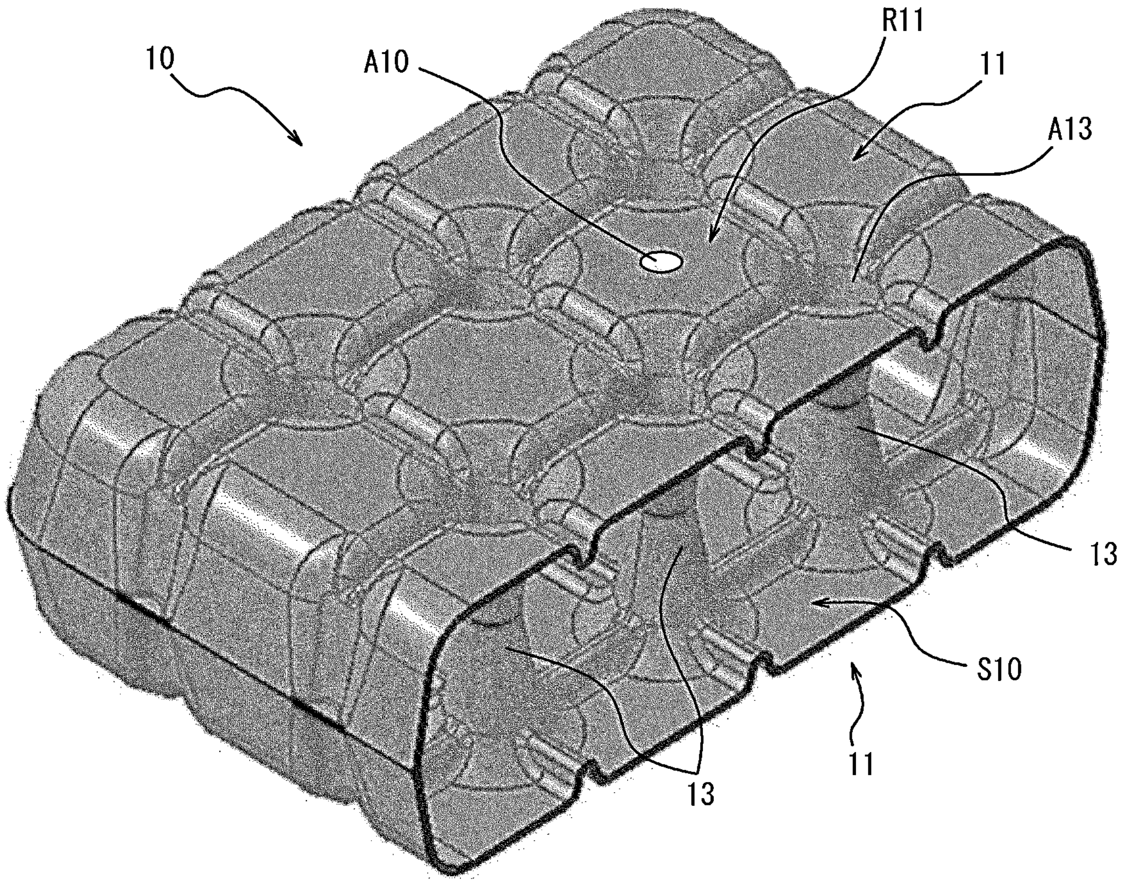
FIG. 5 is a perspective view of the hollow body illustrated in FIG. 3, in which the closs-section taken along the line B-B in FIG. 4 is shown.

Furthermore, referring to FIG. 5, the hollow body 10 has one or more support pillars 13 that support the two opposing walls 11 inside the hollow body 10. The support pillar 13 mechanically increases the rigidity of the hollow body 10 in the direction of its thickness by supporting the two opposing walls 11. This mechanically increases the rigidity of the hollow body 10. Therefore, according to this embodiment, the hollow body 10 has the support pillar 13, which controls the compressive deformation that can occur between the two opposing walls 11.

In this embodiment, the hollow body 10 is embedded in the foam body F so that when the seat pad 1 is installed in a vehicle, the two opposing walls 11 are arranged facing each other in the vertical direction. In this case, the support pillar 13 extends along the vertical direction. This gives the hollow body 10 excellent rigidity against vertical loads and controls compressive deformation in the vertical direction. In addition, in this embodiment, the support pillar 13 has a boss hole A13. The boss hole A13 is filled with foam F. This allows the hollow body 10 to be firmly embedded against the foam body F. The boss hole A13 also reduces the amount of resin used for the support pillar 13. This allows the weight of the hollow body 10 to be reduced.

Figure 6:
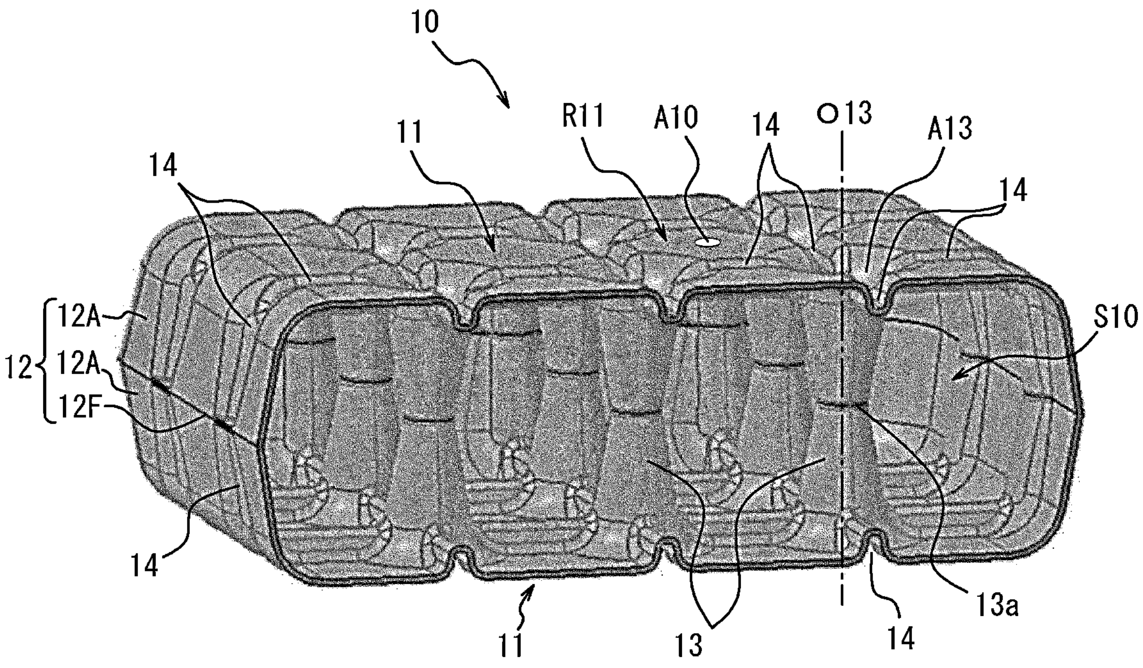
FIG. 6 is another perspective view of the hollow body illustrated in FIG. 3, in which the closs-section taken along the line B-B in FIG. 4 is shown.

Referring to FIG. 6, in this embodiment, the support pillar 13 has a waist 13*a* at the midpoint of the longitudinal axis O13 of the support pillar 13 (which is parallel to the vertical axis when the seat pad 1 is mounted on the vehicle). The area in the orthogonal cross-section of the support pillar 13 is smallest at the waist 13*a*. Here, the area of the orthogonal cross-section of the support pillar 13 is the cross-sectional area of the support pillar 13 when the cross-sectional plane is orthogonal to the longitudinal axis O13 of the support pillar 13. When the drawn part is formed so that the cross-sectional area of the waist 13*a* is the smallest in the longitudinal axes O13 of the support pillar 13, as in this embodiment, the internal volume of the hollow body 10 (volume of the interior space S10) can be secured to a large extent. However, according to the present disclosure, the support pillar 13 can be a straight support pillar with the same diameter along the longitudinal axis O13 of the support pillar 13. Alternatively, according to the present disclosure, the support pillar 13 can be bulged so that the cross-sectional area of the waist 13*a* is the largest in the longitudinal axes O13 of the support pillar 13.

In addition, referring to FIG. 6, the hollow body 10 has one or more ribs 14 extending along the surface of the hollow body 10. The rib 14 mechanically increases the rigidity of the opposing wall 11 or the sidewall 12 on which the rib 14 is provided. This mechanically increases the rigidity of the hollow body 10. Therefore, according to this embodiment, the hollow body 10 has the one or more ribs 14, which control the compressive deformation of the hollow body 10.

In this embodiment, the rib 14 is a concave rib that is concave toward the interior space S10. In this case, the rib 14 does not protrude from the outer surface of the hollow body 10, thereby increasing the rigidity of the hollow body 10 while reducing the size of the hollow body 10. In addition, in this embodiment, the rib 14 is formed in a shape in which the hollow body 10 is bent into a concave shape as illustrated, for example, in FIG. 6. In this case, the rigidity of the hollow body 10 can be increased while reducing the thickness of the hollow body 10. That is, in this case, the use of resin in the hollow body 10 can be reduced to reduce the weight of the hollow body 10 and increase the rigidity of the hollow body 10. However, according to the present disclosure, the rib 14 can be a convex rib protruding toward the opposite side of the interior space S10 (outer surface side of the hollow body 10). The convex rib 14 can also be formed in a shape in which the hollow body 10 is bent into a convex shape.

In this embodiment, each of the one or more ribs 14 extends along the surface of the opposing wall 11 or the sidewall 12. In this embodiment, a rib 14 is connected to the support pillar 13 at the opposing wall 11. In detail, the rib 14 is connected to each of the boss holes A13 of the support pillars 13 adjacent to each other. In addition, in this embodiment, a rib 14 extends, in the sidewall 12, in the direction of the thickness of the hollow body 10 (the direction in which the two opposing walls 11 face each other, in this embodiment, more specifically, the longitudinal direction of the support pillar 13). Furthermore, in this embodiment, the rib 14 on the side of the sidewall 12 is connected to the rib 14 on the side of the opposing wall 11. Referring to FIG. 4, the ribs 14 are formed in a grid pattern on each of the opposing wall 11 in plan view. Also, referring to FIG. 4, the support pillar 13 is disposed on the intersection where the two ribs 14 intersect.

The hollow body 10 in this embodiment is increased in rigidity throughout the opposing walls 11 by the arrangement of a plurality of support pillars 13 in the center of the opposing walls 11. Furthermore, the hollow body 10 has a plurality of small regions R11 divided by a plurality of ribs 14 on the opposing walls 11. If the opposing wall 11 is divided into a plurality of small regions R11, as in this embodiment, the rigidity per one of the small regions R11 is increased. Therefore, according to the hollow body 10 in this embodiment, by arranging a plurality of support pillars 13 in the center of the opposing walls 11 and dividing the opposing walls 11 into a plurality of small regions R11 by a plurality of ribs 14, the pressured deformation (deformation caused by the pressure applied to the hollow body 10. For example, compressive deformation.) that may occur in the whole of the opposing walls 11 can be effectively suppressed. In addition, the hollow body 10 can be increased in its rigidity in the direction of thickness of the hollow body 10 (longitudinal direction of the support pillar 13: direction along the axis O13) by the ribs 14 extending over the sidewall 12. Therefore, according to the hollow body 10, the pressured deformation of the hollow body 10 (especially the compressive deformation in the thickness direction of the hollow body 10) can be effectively controlled.

In this embodiment, the aperture A10 is formed in one of a plurality of small regions R11, which are divided into the opposing walls 11. However, according to the present disclosure, the aperture A10 can be formed in each of at least two or more of the above plurality of small regions R11. Alternately, according to the present disclosure, a plurality of apertures A10 may be formed in one small region R11.

In addition, the aperture A10 can be formed in the rib 14, for example. In this case, the aperture A10 can be formed in each of the plurality of ribs 14. According to the present disclosure, a plurality of apertures A10 may be formed in one rib 14.

According to the present disclosure, the aperture A10 can be formed at any position in the hollow body 10. However, when forming the foam body F of the cushion pad 2 in the mold, the aperture A10 should be positioned so that it does not coincide with the supply port of the resin that forms the foam body F. In this embodiment, the flange 12F of the hollow body 10 corresponds to the portion of the mating surface of the molding die, formed at the location of the mating surface of the molding die. In this embodiment, the aperture A10 is positioned at a location that avoids the flange 12F.

In conventional seat pads, the interior space of the hollow body is a closed space in the mold during integral foaming, with the interior space closed to the exterior space. However, when the hollow body is placed in the cavity of the molding die with the interior of the hollow body closed and foam molding is performed, there was a risk that the hollow body would be deformed for the reasons described below.

(During Foam Molding)

After placing the hollow body in the cavity of the molding die, when resin M, which is the raw material for forming the foam body, is supplied into the cavity and foamed, the pressure in the cavity increases due to the foaming pressure of the resin (hereinafter, also referred to as "supplied resin") M. This pressure increase can cause the deformation of the hollow body placed in the cavity. When the supplied resin foams in the cavity, the temperature in the cavity rises due to the heat of foaming of the supplied resin M. This temperature rise can also cause the deformation of the hollow body. Therefore, when foam molding is performed with a hollow body as an insert, the hollow body heated by the foam heat is subjected to the pressure in the cavity increased by the foam pressure, which may cause the deformation of the hollow body.

(after Foam Molding)

Since many of the cell membranes are closed in the foam body immediately after molding, the foam body may shrink over time after molding. Therefore, in general, crashing treatment (foam breaking treatment) is conventionally applied to the foam body to open the cell membrane and to prevent shrinkage of the foam body. The crushing treatment is generally performed under vacuum or near-vacuum conditions. In this case, the hollow body, along with the foam body, may be deformed by the negative pressure (near vacuum pressure) generated during the crushing treatment.

In contrast, according to the seat pad 1 of this embodiment, the hollow body 10 embedded in the foam body F of the cushion pad 2 has one or more apertures A10, as illustrated in FIG. 2. That is, in this embodiment, the hollow body 10 includes the interior space S10 as an opened space which is open. In addition, the apertures A10 are formed to satisfy the relationship of $10 \leq S(cm^2)/V(L)$ in the above formula (1). If the apertures A10 are formed so that the relationship in the above formula (1) is satisfied, the pressure in the interior space S10 and the pressure in the cavity are maintained near equilibrium through the apertures A10.

According to the seat pad 1 of this embodiment, when forming the foam body F of the cushion pad 2, the internal pressure of the hollow body 10 (pressure in the interior space S10) is close to equilibrium with the foam pressure generated in the cavity, even when the pressure in the cavity is increased by the foam pressure of the supply resin M. Therefore, according to the seat pad 1, the pressured deformation (e.g., compressive deformation) of the hollow body 10 caused by the pressure increase in the cavity during the molding of the foam body F can be controlled. In particular, when forming the foam body F, the temperature in the cavity rises due to the heat of foaming of the supplied resin M, and the hollow body 10 is easily softened by the temperature rise in the cavity. Therefore, if the internal pressure of the hollow body 10 is close to equilibrium with the foam pressure generated in the cavity, as in this embodiment, the pressure difference between the pressure received from the outside of the hollow body 10 (pressure in the cavity) and the internal pressure of the hollow body 10 is reduced even when the hollow body 10 is softened. Therefore, the seat pad 1 according to this embodiment is effective in controlling the pressured deformation of the hollow body 10 caused by the pressure increase in the cavity.

In addition, according to the seat pad 1 of this embodiment, the internal pressure of the hollow body 10 is close to equilibrium with the pressure (vacuum pressure) around the hollow body 10, even when the seat pad 1 is placed in a crash treatment state in the crash treatment after molding. Therefore, according to the seat pad 1, pressured deformation (e.g., expansion deformation) of the hollow body 10 due to pressure changes around the hollow body 10 after the foam body F is molded can be controlled.

Therefore, the seat pad 1 can be the one in which the deformation of the hollow body 10 made of resin, embedded in the foam body F, is controlled.

Also, in this embodiment, in the seat pad 1, the apertures A10 are formed to satisfy the condition of the following formula (2).

$$S/V \leq 30 \tag{2}$$

In this case, the supplied resin M is less likely to flow into the aperture A10, which makes it more difficult to block the aperture A10. Thus, in this case, the seat pad 1 can be the one in which the deformation of the hollow body 10 made of resin is further controlled. Furthermore, in this case, the size of the aperture A10 is small in relation to the internal volume V of the hollow body 10, so there are fewer restrictions on the installation location of the aperture A10 when it is installed in the hollow body 10. This makes it possible, from the beginning, to install the aperture A10 in a location where it is difficult for the supplied resin M to flow in, and also makes it easier to maintain the mechanical strength of the hollow body 10. By making it difficult for the supplied resin M to flow into the aperture A10, the internal volume V of the hollow body 10 can be maintained.

Referring to FIG. 6, for example, in this embodiment, the hollow body 10 has two opposing walls 11, and furthermore, the hollow body 10 has the support pillar 13 that supports the two opposing walls 11 inside the hollow body 10. In this case, the mechanical rigidity of the hollow body 10 is increased by the support pillar 13. Therefore, in this case, the seat pad can be the one in which the deformation of the hollow body 10 made of resin is further controlled.

In addition, in this embodiment, the hollow body 10 has a rib 14 extending along the surface of the hollow body 10. In this case, the rib 14 increases the mechanical rigidity of the hollow body 10 made of resin. Therefore, in this case, the seat pad can be the one in which the deformation of the hollow body 10 is further controlled.

[Method for Manufacturing a Seat Pad]

The method for manufacturing a seat pad in accordance with this embodiment is a method for manufacturing a seat pad, for obtaining a seat pad having a hollow body 10 made of resin and a foam body F in which the hollow body 10 is embedded. The method for manufacturing a seat pad according to this embodiment includes a hollow body placement step of placing the hollow body 10 in a cavity C formed by closing a molding die 100 and a foam body formation step of forming the foam body F by foaming the supplied resin M supplied into the cavity C after the hollow body placement step. The hollow body 10 has one or more apertures A10 formed therein, and the one or more apertures A10 are formed to satisfy the condition of the aforementioned formula (1).

Figure 7A:
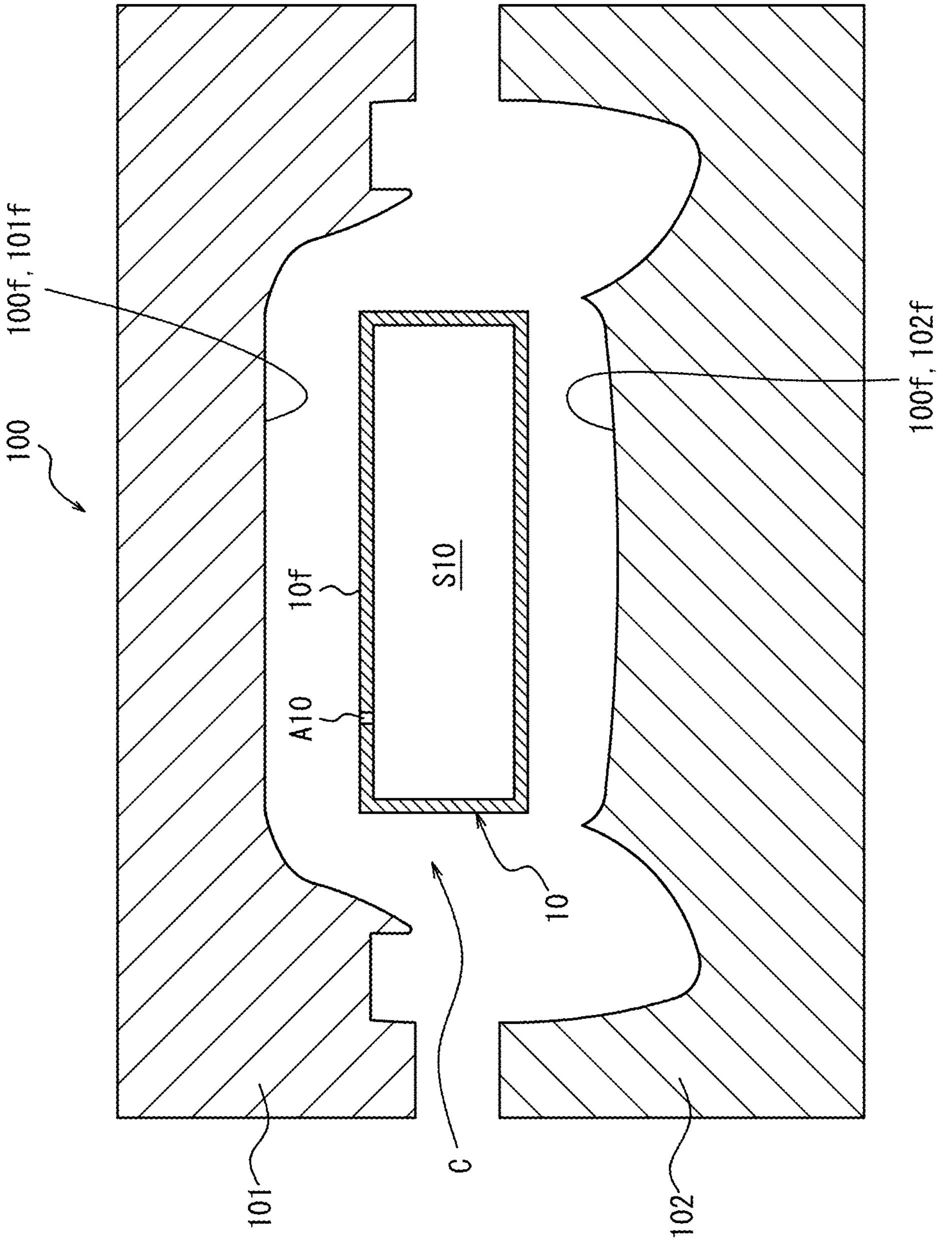
FIG. 7A is a schematic cross-sectional view of a molding die that can be used in a method for manufacturing a seat pad of this disclosure in a state before mold clamping.
Figure 7B:
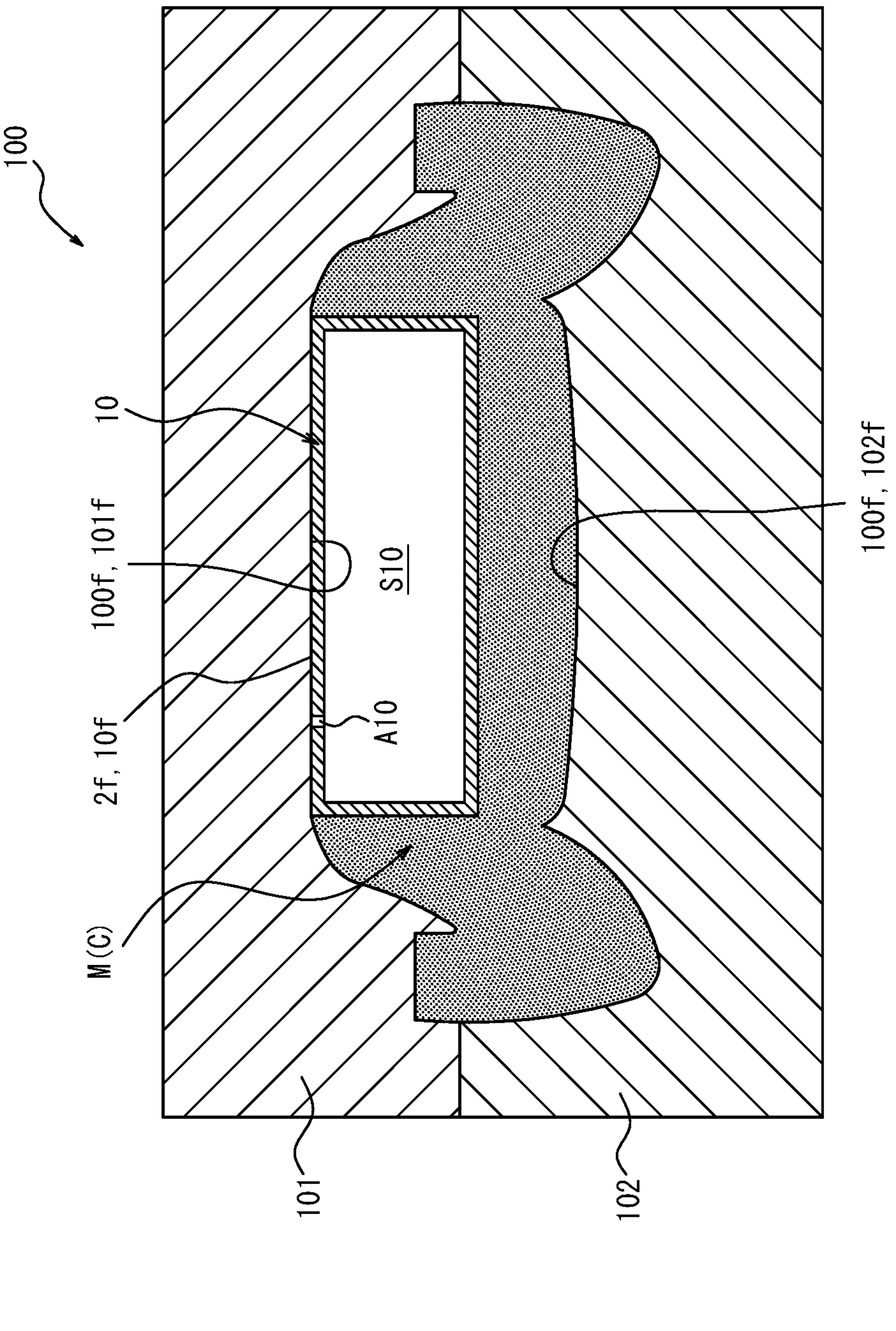
FIG. 7B is a schematic cross-sectional view of a molding die illustrated in FIG. 7A in a state of mold clamping.

Referring to FIGS. 7A and 7B, the method for manufacturing a seat pad is explained below. This method for manufacturing a seat pad is described as a method for manufacturing a cushion pad to obtain the cushion pad 2.

FIG. 7A schematically illustrates a molding die 100 that can be used in the method for manufacturing a seat pad according to one embodiment of this disclosure, in a state before mold clamping. FIG. 7B schematically illustrates the molding die 100, in a state of mold clamping.

Referring to FIG. 7B, the reference numeral 100 is a molding die for obtaining the cushion pad 2. The molding die 100 comprises an upper die 101 located on the upper side of the molding die 100 and a lower die 102 located on the lower side of the molding die 100. The inner surface 100*f* of the molding die 100 is formed by the inner surface 101*f* of the upper die 101 and the inner surface 102*f* of the lower die 102. That is, in this embodiment, the cavity C formed in the molding die 100 is formed by the inner surface 101*f* of the upper die 101 and the inner surface 102*f* of the lower die 102.

(Hollow Body Placement Step)

Referring to FIG. 7A, in the hollow body placement step, the upper die 101 and the lower die 102 are opened, and then the hollow body 10 described above using, for example, FIGS. 3 to 6 is placed between the upper die 101 and lower die 102. The hollow body 10 can be positioned with respect to the lower die 102 by, for example, a holding portion (not illustrated) formed on the inner surface 102*f* of the lower die 102. Next, as illustrated in FIG. 7B, the upper die 101 and lower die 102 are matched to form the cavity C inside the molding die 100. As a result, the hollow body 10 is placed at a predetermined position within the cavity C. In this embodiment, in the hollow body placement step, the apertures A10 in the hollow body are placed in a location that does not coincide with a supply port where the supplied resin M is supplied (not illustrated). In this embodiment, the aforementioned supply port is located in the lower die 102. That is, the supplied resin M is supplied from the side of the lower die 102, and the supplied resin M foams from the lower die 102 to the upper die 101. In this embodiment, the hollow body 10 is set in the cavity C so that it is positioned closer to the upper die 101 than to the lower die 102. Furthermore, the hollow body 10 is set in the cavity C so that the aperture A10 is positioned facing the upper die 101. If the hollow body 10 is positioned close to the upper die 101 and the aperture A10 is positioned facing the upper die 101, as in this embodiment, the aperture A10 will not automatically face the supply port. This automatically places the aperture A10 in a location that does not coincide with the supply port in this embodiment. That is, according to this disclosure, because the hollow body 10 is positioned closer to the upper die 101 (lower die 102) than the lower die 102 (upper die 101) where the supply port is located, and the hollow body 10 is positioned so that the aperture A10 faces the upper die 101 (lower die 102), the aperture A10 will automatically not coincide with the supply port. In addition, in this embodiment, in the hollow body placement step, the aperture A10 in the hollow body is placed in a location that does not coincide with the mating surface of the upper and lower dies 101 and 102 of the molding die 100 (see FIG. 7B).

(Foam Body Formation Step)

After the hollow body placement step, the upper die 101 and the lower die 102 of the molding die 100 are closed together and the supplied resin M is injected into the cavity C. The supplied resin M foams in the cavity C to form the foam body F that covers the hollow body 10 in the cavity C. Next, the upper die 101 and the lower die 102 are opened to remove the foam body F in which the hollow body 10 is embedded. Thereby, the cushion pad 2 with the hollow body 10 embedded in the foam body F can be obtained.

The hollow body 10 used in this embodiment contains the interior space S10 as an opened space which is open through the aperture A10. In addition, the apertures A10 are formed to satisfy the relationship $10 \leq S\ (cm^2)/V(L)$ in the above formula (1). In this case, with the mold 100 is closed, the pressure in the interior space S10 and the pressure in the cavity are maintained near equilibrium through the aperture A10, even when the cavity temperature rises due to the heat of foaming of the supplied resin M and the cavity pressure rises due to the foaming pressure of the supplied resin. That is, according to the method for manufacturing a seat pad of this embodiment, the internal pressure of the hollow body 10 is close to equilibrium with the foaming pressure generated in the cavity, even though the pressure in the cavity C, which is increased by the foaming pressure, is added to the hollow body 10 heated by the foam heat. Therefore, according to the method for manufacturing a seat pad of this embodiment, pressured deformation (e.g., compressive deformation) of the hollow body 10 caused by increased pressure in the cavity C can be controlled.

Therefore, according to the method for manufacturing a seat pad of this embodiment, it is possible to obtain a cushion pad 2 in which deformation of the hollow body 10 made by resin, embedded in the foam body F, has been controlled.

In addition, in this embodiment, the apertures A10 are formed to satisfy the condition of the above formula (2). In this case, the supplied resin M is less likely to flow into the aperture A10, which makes it more difficult to block the aperture A10. Thereby, it is possible to obtain a seat pad in which deformation of the hollow body 10 made of resin has been further controlled.

In addition, in the aforementioned hollow body placement step in this embodiment, the apertures A10 are placed in a location that does not coincide with the supply port where the supplied resin M is supplied, when the hollow body 10 is placed in the cavity C. In this case, it can be made difficult for the supplied resin M to flow into the interior space S10 through the aperture A10. If the aperture A10 coincide with the supply port, the supplied resin M may reach the aperture A10 in a low-viscosity state. In this case, it is conceivable that the supplied resin M could unintentionally enter the aperture A10. The penetration of the supplied resin M causes a decrease in the density of the foam body F and a decrease in the total area of the apertures A10. The decrease in the density of the foam body F affects the cushioning properties and the decrease in the total area of the apertures A10 affects the deformation control of the hollow body 10. In contrast, if the location of the aperture A10 does not coincide with the supply port, as in this embodiment, the supplied resin M can be prevented from entering the aperture A10. This prevents the supplied resin M from unintentionally entering the aperture A10, and as a result, prevents the supplied resin M from blocking the aperture A10. Therefore, in this case, the total area of the apertures A10 can be secured as well as the density decrease of the foam body F can be controlled.

In addition, in the aforementioned hollow body placement step in this embodiment, the apertures A10 are placed in a location that does not coincide with the mating surface of the molding die 100. In this case, it is more difficult for the supplied resin M to flow into the aperture A10. Thereby, in this case, it is possible to obtain a seat pad in which deformation of the hollow body 10 made of resin has been even further controlled.

In addition, in this embodiment, the hollow body 10 has the two opposing walls 11, and furthermore, the hollow body 10 has the support pillar 13 supporting the two opposing walls 11 inside the hollow body 10. In this case, the mechanical rigidity of the hollow body 10 is increased by the support pillar 13. Thus, in this case, it is possible to obtain a seat pad in which deformation of the hollow body 10 made of resin is further controlled.

In addition, in this embodiment, the hollow body 10 has a rib 14 extending along a surface of the hollow body 10. In this case, the mechanical rigidity of the hollow body 10 is increased by the rib 14. Therefore, in this case, it is possible to obtain a seat pad in which deformation of the hollow body 10 made of resin is further controlled.

Tables 1 and 2 below provide the results of testing samples 101 to 120 of the hollow bodies 10 and evaluating the amount of permanent deformation that occurred in them.

TABLE 1

| | 101 | 102 | 103 | 104 | 105 | 106 | 107 | 108 | 109 | 110 |
|---|---|---|---|---|---|---|---|---|---|---|
| Hole diameter | 1 | | 1 | | 1 | | 1 | | 1 | |
| Number | 1 | | 2 | | 4 | | 8 | | 12 | |
| Area | 0.8 | | 1.6 | | 3.1 | | 6.3 | | 9.4 | |
| S/V | 0.9 | | 1.7 | | 3.4 | | 6.8 | | 10.2 | |
| X | C | C | C | C | C | C | C | A | A | A |
| Y | C | C | C | C | C | C | C | A | A | A |
| Z | C | B | C | B | B | A | A | A | A | A |

TABLE 2

| | 111 | 112 | 113 | 114 | 115 | 116 | 117 | 118 | 119 | 120 |
|---|---|---|---|---|---|---|---|---|---|---|
| Hole diameter | 1 | | 2 | | 2 | | 2 | | 2 | |
| Number | 16 | | 1 | | 2 | | 4 | | 8 | |
| Area | 12.6 | | 3.1 | | 6.3 | | 12.6 | | 25.1 | |
| S/V | 13.7 | | 3.4 | | 6.8 | | 13.7 | | 27.3 | |
| X | A | A | A | C | A | A | A | A | A | A |
| Y | A | A | C | C | A | A | A | A | A | A |
| Z | A | A | C | B | A | A | A | A | A | A |

The "Hole diameter" refers to the diameter of the aperture A10. The unit for the "Hole diameter" is centimeters (cm). The "number" refers to the number of apertures A10 formed in the hollow body 10. The "Area" is indicated by "S". "S" is the total area of the apertures A10 (total opening area). The unit of "S" is square centimeters ($cm^2$). "V" is the internal volume of the hollow body 10. The unit of "V" is the liter (L). In this test, "V" is 0.92 L (liter). "X", "Y" and "Z" are the coordinate axis directions of the hollow body 10. "A" is an evaluation result indicating that (almost) no permanent deformation has occurred. "C" is an evaluation result indicating that permanent deformation that cannot be tolerated in use has occurred. "B" is an evaluation result indicating that permanent deformation that can be tolerated in use has occurred.

In the above test, two samples with the same "hole diameter" and "number" are used as one set, and a total of 10 sets of samples (101-102, 103-104, 105-106, 107-108, 109-110, 111-112, 113-114, 115-116, 117-118, 119-120) are used to increase the accuracy of the test results.

Referring to Tables 1 and 2, it can be seen that the pair of samples in which both of the two samples satisfy $10 \leq S/V$ (107-108, 109-110, 111-112, 115-116, 117-118, 119-120) showed almost no permanent deformation in all the coordinate axes of the hollow body 10.

The above describes an exemplary embodiment of this disclosure, and various changes can be made without departing from the scope of the claims. For example, the present embodiment is described in the cushion pad 2, of the seat pad 1, but this disclosure can be applied to the back pad 3 or the headrest 4. In addition, the seat pad according to this disclosure only needs to include at least one of the cushion pad 2, the back pad 3 and the headrest 4. In addition, the molding die 100 should include at least two of the following: the upper die 101 and the lower die 102. The various configurations employed in each of the above-mentioned embodiments can be replaced with each other as appropriate.

REFERENCE SIGNS LIST

1 Seat pad
2 Cushion pad
3 Back pad
4 Headrest
5 Hollow body
11 Opposing wall
12 Sidewall
12A Sloping wall
12F Flange
13 Support pillar
13A Boss hole
14 Rib
100 Molding die
101 Upper die
102 Lower die
A10 Aperture
S10 Interior space
C Cavity
F Foam body
M Supplied resin
R11 Small region

The invention claimed is:

1. A seat pad comprising a hollow body made of resin and a foam body in which the hollow body is embedded, and the hollow body has one or more apertures formed therein, and the one or more apertures are formed to satisfy the following condition:

$$10.2 \leq S/V \leq 27.3 \quad (1)$$

$$9.4 \leq S \leq 25.1 \quad (2)$$

where S is total area of the apertures in square centimeters, and V is internal volume of the hollow body in liters.

2. The seat pad according to claim 1, wherein the hollow body has two opposing walls and a support pillar supporting the two opposing walls inside the hollow body.

3. The seat pad according to claim 2, wherein the hollow body has a rib extending along a surface of the hollow body.

4. The seat pad according to claim 1, wherein the hollow body has a rib extending along a surface of the hollow body.

5. A method for manufacturing a seat pad having a hollow body made of resin and a foam body in which the hollow body is embedded, the method including:

a hollow body placement step of placing the hollow body in a cavity formed by closing a molding die; and a foam body formation step of forming the foam body by foaming resin supplied into the cavity after the hollow body placement step, the hollow body has one or more apertures formed therein, and the one or more apertures are formed to satisfy the following condition:

$$10.2 \leq S/V \leq 27.3 \quad (1)$$

-continued $$9.4 \leq S \leq 25.1 \quad (2)$$

where S is total area of the apertures in square centimeters, and V is internal volume of the hollow body in liters.

6. The method for manufacturing a seat pad according to claim 5, wherein, in the hollow body placement step, the apertures are placed in a location that does not coincide with a supply port where the resin is supplied.

7. The method for manufacturing a seat pad according to claim 6, wherein, in the hollow body placement step, the apertures are placed in a location that does not coincide with a mating surface of the molding die.

8. The method for manufacturing a seat pad according to claim 7, wherein the hollow body has two opposing walls and a support pillar supporting the two opposing walls inside the hollow body.

9. The method for manufacturing a seat pad according to claim 6, wherein the hollow body has two opposing walls and a support pillar supporting the two opposing walls inside the hollow body.

10. The method for manufacturing a seat pad according to claim 6, wherein the hollow body has a rib extending along a surface of the hollow body.

11. The method for manufacturing a seat pad according to claim 5, wherein the hollow body has two opposing walls and a support pillar supporting the two opposing walls inside the hollow body.

12. The method for manufacturing a seat pad according to claim 5, wherein the hollow body has a rib extending along a surface of the hollow body.

* * * * *